UNITED STATES PATENT OFFICE.

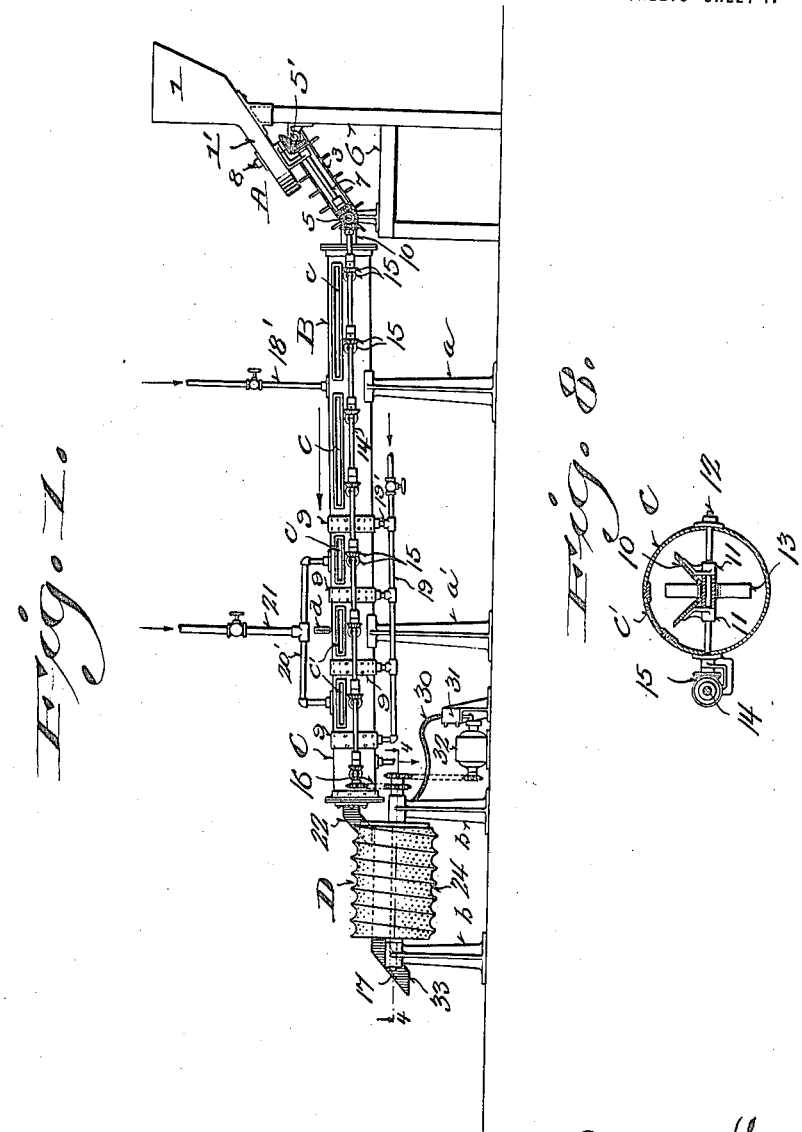

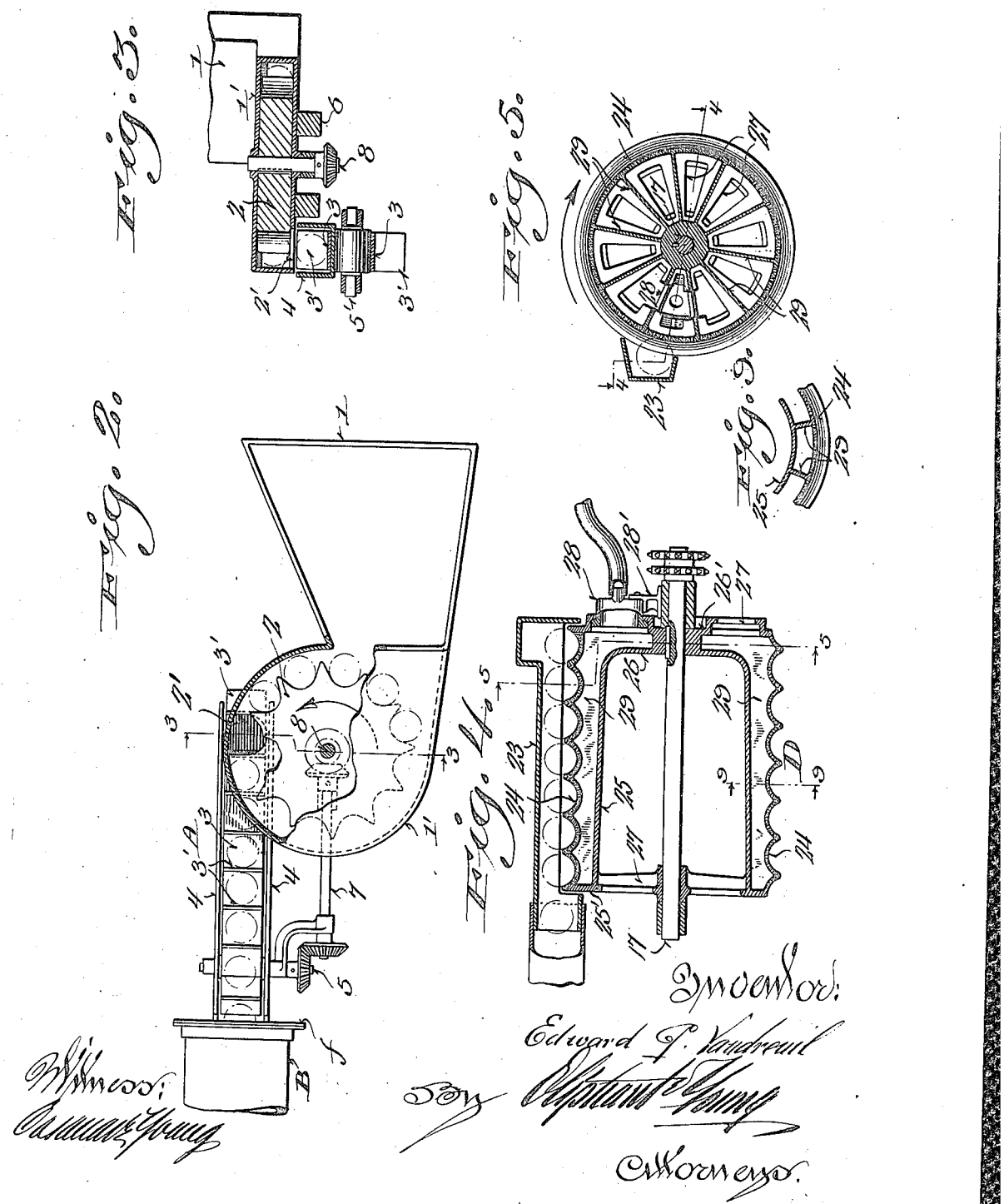

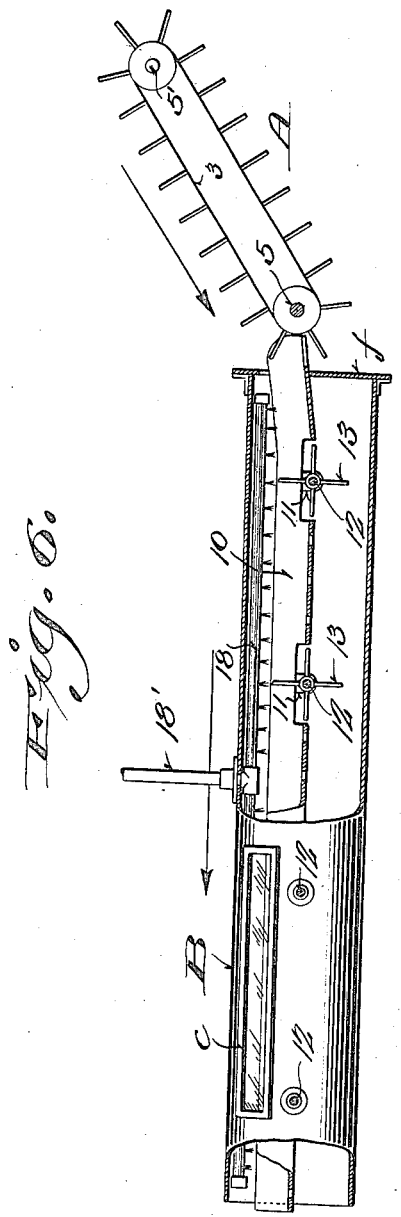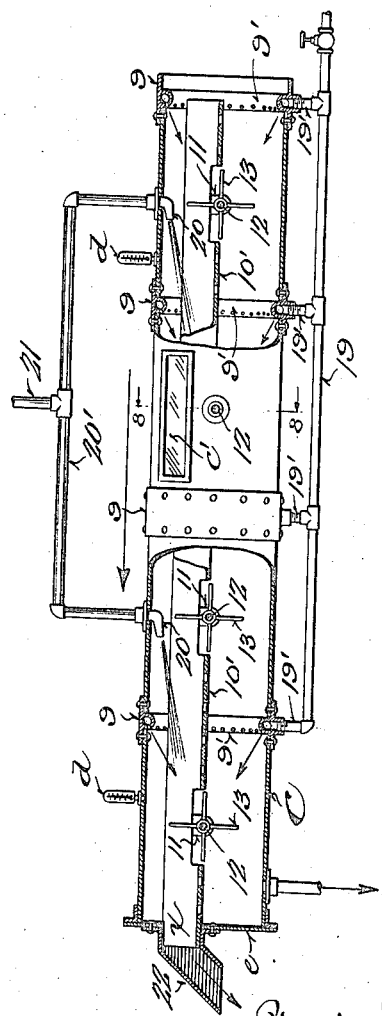

EDWARD J. VAUDREUIL, OF EAU CLAIRE, WISCONSIN.

APPARATUS FOR TREATING THIN-SKINNED PRODUCTS FOR CANNING.

1,173,230.  Specification of Letters Patent.  Patented Feb. 29, 1916.

Application filed May 13, 1915. Serial No. 27,925.

*To all whom it may concern:*

Be it known that I, EDWARD J. VAUDREUIL, a citizen of the United States, and resident of Eau Claire, in the county of Eau Claire and State of Wisconsin, have invented certain new and useful Improvements in Apparatus for Treating Thin-Skinned Products for Canning; and I do hereby declare that the following is a full, clear, and exact description thereof.

My invention has for its object to provide a simple, economical and effective apparatus for treating tomatoes, peaches, plums or similar thin-skinned products for canning, whereby the product is washed, subjected to a cooking fluid while traveling through a conveyer, whereby the skins are loosened, and thereafter the units of the product are agitated and subjected to the influence of fluid to cause the loosened skins to be removed, the entire operation being completed without handling the product at any time.

With the above objects in view the invention consists in certain peculiarities of construction and combination of parts as set forth hereinafter with reference to the accompanying drawings and subsequently claimed.

In the drawings Figure 1 represents a side elevation of an apparatus embodying the features of my invention; Fig. 2, an enlarged detailed plan view of the hopper end of the apparatus with parts broken away and in section to illustrate structural features more clearly; Fig. 3, a cross-section through the hopper apparatus, the section being indicated by line 3—3 of Fig. 2; Fig. 4, a sectional plan view upon an enlarged scale of the finishing end of the apparatus, the section being indicated by line 4—4 of Fig. 1 and shows means for delivering the product to a spiral drum, whereby said product is subjected to a suction or vacuum influence to remove the skins therefrom; Fig. 5, a detailed cross-section of the drum mechanism, the section being indicated by line 5—5 in Fig. 4; Fig. 6, an enlarged detailed elevation of the forward end of an inclined conveyer wherein the product is washed, parts being broken away and in section to show the assembled mechanical elements; Fig. 7, a similar view of the rear end of the conveyer showing mechanism for subjecting the product to a cooking or scalding operation whereby the skin from each unit is loosened preparatory to being delivered to the vacuum apparatus; Fig. 8, a detailed cross-section through the blanching end of the conveyer, as shown in Fig. 7, said section being indicated by line 8—8 of the last mentioned figure, and Fig. 9, a detailed fragmentary cross-section of the drum showing its suction channel arrangement.

Referring by characters to the drawings with especial reference to Figs. 1 to 3 inclusive, 1 represents the boot of a hopper which is adapted to discharge into a downwardly inclined circular foot portion 1', the said foot portion constituting a shell for a rotary disk 2, the periphery of which disk is recessed to form semi-pockets in conjunction with the shell, whereby the units of the product to be treated are separated and delivered one by one to a discharge aperture 2' that is formed in the bottom wall of the boot. The end of a cellular endless belt A is positioned directly under the discharge aperture 2', whereby the units of the product are separately delivered into the open end of an inclined housing B. The cellular belt comprises an endless belt 3 having vertically disposed wings 3' extending from its surface to form cellular compartments in conjunction with fixed side walls 4 of a belt-supporting trough. Thus the working stretch of the belt travels through the trough to the mouth of the housing. The said belt is mounted upon suitable rollers that have trunnions 5, 5', which are revoluble in bearings that are supported upon a frame 6, it being understood that this cellular belt is upon an oblique plane approximately paralleling the plane of the hopper boot. The trunnion 5 of the belt comprises a drive-shaft for the mechanism, one end being in miter-gear connection with a shaft 7, the opposite end of which shaft in turn is in miter-gear connection with a shaft 8 which carries the pocketed disk 2 that is revoluble within the hopper foot. Thus motion is imparted to the feed mechanism.

The housing section B is suitably supported in oblique position by a standard $a$, as best shown in Fig. 1 of the drawings, and the blanching section C of said housing is similarly supported by a standard $a'$, the two housing sections being connected into a continuous housing by a ring 9 which is fitted over the juxtaposed ends of the housing sections A and B and riveted thereto. The washing housing section B has mounted therein a downwardly inclined trough conveyer 10, the receiving end of which is positioned to collect the units of the product that may be delivered thereto from the cellular belt A. This conveyer trough is supported by brackets 11 which are loosely mounted upon a series of transversely disposed shafts 12 and at the point of intersection between the several shafts and trough bottom, the said bottom is cut away to permit rotary play of a reel 13, one of which is secured to each shaft. The reels are formed with radial wings that are rotated at the desired speed, whereby the units or product are delivered between the wings and from this point they are transferred to the bottom of the conveyer trough upon the opposite side, and, owing to the inclined position of the trough, they will roll by gravity to the next reel where they will be trapped and delivered to the succeeding reel and so on throughout the series. Thus the several reels constitute rotary dam elements, whereby the speed of the feed of the product is regulated in its travel throughout the length of the trough 10, it being understood that this arrangement permits the units of the product to be separated in a single line as they travel from end to end. The reels which thus constitute rotary dams, are driven by a longitudinally positioned common shaft 14, which shaft is journaled in suitable bearings that project from one side of the trough, there being a miter-gear connection 15 between this shaft and each transverse reel shaft. The drive shaft 14 receives its motion from a sprocket-gear connection 16 to a drum shaft 17 that is positioned at the discharge end of the housing, the said drum-shaft in turn being mounted upon bearings formed in standards $b$, which mechanism will be hereinafter more fully described. The housing B, as shown, is also provided with a warm water distributing pipe 18′ which extends lengthwise thereof and is perforated at intervals to discharge washing and cleansing sprays upon the product as it travels through the trough 10, the bottom of the trough being perforated to permit drainage. The distributing pipe 18′ is fed from a main supply pipe 18 that leads into the housing from any suitable source. The housing section B is also provided with glazed windows $c$ at intervals throughout its length, whereby the product may be inspected during its travel from end to end of the housing.

The cooking or blanching section C of the housing is also provided with an inclined conveyer trough section 10′, which forms a continuation of the trough section 10 and the said trough section 10′ is similarly equipped in every respect with winged reels 13 and their associated driving mechanism, which is identical with that described in connection with the first section of the housing. The ring 9, which connects the housing sections A and B, is formed with a circular chamber 9′ which is apertured at intervals and is adapted to receive and discharge steam in the direction of travel of the product, as indicated by the arrows. The steam is supplied through a branch pipe 19′ of a main steam supply pipe 19 which runs lengthwise of the cooking or blanching section B of the housing. The blanching section B is also interrupted at intervals by similar rings 9 having apertured steam chambers 9″, whereby jets of steam are delivered at suitable intervals to the product throughout its travel along the length of the trough 10′, it being understood that the series of rings are supplied from the main pipe 19 by similar branches 19′ to that described in connection with the first mentioned ring 9. Scalding water is discharged obliquely and in the direction of travel of the product at intervals throughout the length of the housing B from nozzles 20, 20, which nozzles are supplied by branch-pipes 20′ from a main feed pipe 21. Attention is called to the fact that the spray of hot water is directed upon certain of the winged reels 13, together with certain sprays of the steam, and hence as the product is trapped or dammed by the wings of the reel momentarily, it is subjected to an intense spray of water and steam to thus partially cook or blanch each unit and the final reel 13 at the discharge end of the housing B will deliver the now blanched product to the discharge end $x$ of the trough, from which it is delivered by a chute 22 to the forward open end of a horizontally disposed product-receiving trough 23. This trough is closed upon three sides and its open side is arranged in juxtaposition to a horizontally disposed drum D, which drum is mounted upon the shaft 17 referred to hereinbefore.

As best shown in Figs. 4 and 5 of the drawings, the annular surface of the drum is perforated throughout and formed into a continuous spiral groove 24, each convolution of which is semi-circular or concaved in cross-section. Thus, as best shown in the sectional view Fig. 4, each groove forms, in conjunction with the bottom of the trough 23, a pocket for one of the units of the product to be treated. Spaced inwardly from the spiral perforated surface of the drum is a bottom wall 25 which is closed by a web 25′ at the outer head of the drum and at the inner head of the drum the bottom wall is merged into the inner wall 26 of a spider head, which head is secured to the shaft 17. The outer head of the drum is connected to the shaft by spider arms 27. The head 26 is provided with an outer wall 26' which is formed with a shouldered circular opening 27 therein, into which opening is fitted a flanged suction head 28, the said head being secured to the upper end of the adjacent standard B by a bracket 28', whereby the suction head is held rigid, while the drum-head is adapted to revolve thereabout through its circular opening connection 27. The bottom-wall 25, together with the head wall 26 and outer wall head 26' are divided radially into a series of vacuum compartments by partition walls 29 which are arranged at regular intervals throughout the circumference of the drum. The fixed suction head 28 is connected by a hose 30 or other suitable means to a vacuum producer 31, as best shown in Fig. 1 of the drawings, which vacuum producer is operated by a motor 32, the said motor being in belt gear connection with the drum shaft 17, whereby power is transmitted to said drum and the entire mechanism.

It is also understood that the blanching or scalding section of the trough C is equipped with glazed inspection windows c' at intervals, whereby the product may be observed in the process of the operation and the said sectional trough is also equipped with suitable thermometers d, whereby the correct temperature may be maintained within the trough. It should also be observed that, with the exception of the mouth of the conveyer sections 10 and 10', which project through their respective trough-sections, the ends of said trough sections are closed by heads e, f, whereby the required amount of heat within the trough is maintained.

This apparatus is especially, as stated, designed for treating thin-skinned fruits or vegetables and more particularly tomatoes, but it should be understood that vegetables of the pulse variety may be treated by said apparatus, under which conditions the vacuum drum D would be dispensed with. Hence peas or like vegetable products can be caused to travel through the drum sections by gravity whereby they are washed and blanched in a simple and effective manner and the usual expensive and complicated mechanism for effecting this canning treatment is eliminated.

While I have described one complete apparatus for entering into minute details of construction, it is manifest that the structural features may be varied indefinitely within the knowledge of skilled mechanics for accomplishing the final result desired, without departing from the spirit of my invention.

As an example, when the machine is utilized for treating tomatoes, the ripe product is delivered to the hopper 1 and one by one the units are delivered to the cellular belt conveyer A through the interposed pocketed disk 2. From the cellular belt each tomato is dropped upon the inclined conveyer or trough 10 and as one of the units enters between the wings of the damming rotor, it is positively bridged over the opening by the action of the wings and deposited upon the bottom of the conveyer where by gravity it rolls to the next winged rotor and so on throughout the first section B of the housing. Thus each unit of the product is held under perfect control while sprays of warm water are delivered thereto, whereby the product is washed upon all sides due to its continual rolling movement. After being washed, for example, the units will enter the blanching or cooking section B of the trough and be similarly delayed at intervals by the winged rotors and during their travel through this trough section they will each be subjected to jets of steam and hot water which is discharged in the direction of travel of the product, whereby each unit will be thoroughly treated by the hot fluids to cause their skins to be loosened and attention is called to the fact that, while the fluids, owing to the direction of their discharge, will tend to accelerate the movement of the units toward the discharge end of the housing section, they will be sufficiently delayed to effect the desired blanching or cooking operation by the winged rotors, which will thus handle each unit separately to insure each and every unit being uniformly treated. Thereafter the scalded units will drop into the trough 23 and as they nest one by one within the spiral flights of the drum, they will be caused to travel at a uniform speed from one end of the drum to the other in an approximate line due to their being guided by the walls of the trough. The drum, as shown, is rotated in the direction of the arrow, tending to lift the units upwardly as they are engaged by the spiral surface. Hence said units are being continually rotated or agitated as they travel from the receiving end of the trough 23 to the discharge end, whereby it is insured that the entire surface of each unit will, at some time, contact with the perforated surface of the drum D. As these suction compartments of the drum travel past the suction head 28, it will be observed that a suction influence will be exerted upon the surface of the alined series of tomatoes as each suction compartment comes into the field of the open side of the trough 23. Hence the partial vacuum causes an inrush of air which will strip the thin skins from the tomatoes or other article treated in a thorough and effective manner, it being understood that each tomato is subjected to a continual suction in its slow travel from end to end of the drum and is being agitated throughout this length of travel to insure the entire surface of the tomato being acted upon by the fluid under pressure. It will also be observed that the skins which are separated from the product, while momentarily adhering to the perforated surface of the drum, there will be no tendency for the same to collect thereon as the vacuum is broken after the drum surface leaves the trough 23 and the collected skins will then drop by gravity clear of the surface of said drum. It is understood, however, that brushes or other stripping devices may be arranged in connection with the spiral surface of the drum for positively removing the separated skins. After the product has been subjected to the vacuum treatment whereby the skins are removed, they will be discharged into a suitable container, not shown, through the delivery chute 33.

For clearness in the illustration, the cellular conveyer shown in Figs. 1 and 6, is illustrated with the trough constituting the side members 4 of said belt removed.

I claim:

1. An apparatus for treating thin-skinned products for canning comprising a trough having one of its sides open, a conveyer for delivering products to the trough, means associated with the conveyer for subjecting the products to a temperature whereby the skins are loosened, a shiftable porous member arranged to form a closure for the open side of the trough, and means for causing currents of air to travel through the porous member, whereby the loosened skins of the product are separated from the body portions thereof.

2. An apparatus for treating thin-skinned products for canning comprising a trough having one of its sides open, a conveyer for delivering products to the trough, means associated with the conveyer for subjecting the products to a temperature whereby the skins are loosened, a rotary drum having perforated spiral grooves therein arranged to travel past the open side of the trough, a series of separate air channels associated with the spiral perforated surface of the drum, and means for causing successive currents of air to pass through the channels as said channels are brought into the field of the trough.

3. An apparatus for treating thin-skinned products for canning comprising a trough having an open side, a conveyer for delivering products to the trough, means associated with the conveyer for subjecting the products to a temperature whereby the skins are loosened, a vacuum chamber having a perforated wall juxtaposing the open side of the trough, and means for causing currents of air to travel through the vacuum chamber whereby the products are stripped of their skins.

4. An apparatus for treating thin-skinned products for canning comprising a trough having one of its sides open, a conveyer for delivering products to the trough, means associated with the conveyer for subjecting the products to a temperature whereby the skins are loosened, a shiftable porous member arranged to form a closure for the open side of the trough, and means for causing fluid to travel through the porous member, whereby the loosened skins of the product are separated from the body portions thereof.

5. An apparatus for treating thin-skinned products for canning, comprising means for subjecting the units of the products to heat, whereby their skins are loosened, a trough having one of its sides open, the said trough being arranged to receive the loosened skin products, a rotatable drum having its surface spirally grooved and perforated, adapted to form a closure for the open side of said trough, whereby the units of the product are caused to travel from end to end of said trough, and fluid suction means associated with the drum for subjecting the traveling units of the product to currents of air, whereby the loosened skins of the same are removed.

In testimony that I claim the foregoing I have hereunto set my hand at city of Eau Claire, in the county of Eau Claire and State of Wisconsin, in the presence of two witnesses.

EDWARD J. VAUDREUIL.

Witnesses:
T. T. FRAWLEY,
CLARA SCHROEDER.